(12) United States Patent
Moore (10) Patent No.: US 8,205,308 B2
(45) Date of Patent: Jun. 26, 2012

(54) FRICTION CLAMP

(75) Inventor: Simon Garry Moore, Cambridge (NZ)

(73) Assignee: Puku Limited, Cambridge (NZ)

( * ) Notice: Subject to any disclaimer, the term of this patent is extended or adjusted under 35 U.S.C. 154(b) by 866 days.

(21) Appl. No.: 12/162,103

(22) PCT Filed: Jan. 16, 2007

(86) PCT No.: PCT/NZ2007/000008
§ 371 (c)(1),
(2), (4) Date: Dec. 9, 2008

(87) PCT Pub. No.: WO2007/086757
PCT Pub. Date: Aug. 2, 2007

(65) Prior Publication Data
US 2009/0297262 A1  Dec. 3, 2009

(30) Foreign Application Priority Data

Jan. 24, 2006 (NZ) ....................... 544906
Dec. 20, 2006 (NZ) ....................... 551219

(51) Int. Cl.
*F16B 7/10* (2006.01)
(52) U.S. Cl. ................ 24/456; 24/545; 29/450; 403/19; 403/341

(58) Field of Classification Search .............. 24/530, 24/536, 538, 545, 550, 488, 484, 456; 403/409.1, 403/361, 19, 229, 379.6, 109.5, 109.7, 341; 29/450

See application file for complete search history.

(56) References Cited

U.S. PATENT DOCUMENTS

| 423,666 | A |   | 3/1890 | Bryant |   |
|---|---|---|---|---|---|
| 1,829,657 | A |   | 10/1931 | Jones |   |
| 1,850,713 | A |   | 3/1932 | Fox |   |
| 2,648,247 | A |   | 8/1953 | Schmuziger |   |
| 3,042,433 | A | * | 7/1962 | Koen | 403/19 |
| 3,473,202 | A | * | 10/1969 | Howard | 403/344 |
| 3,512,034 | A |   | 5/1970 | Jenkins |   |
| 4,012,913 | A |   | 3/1977 | Scott |   |
| 4,083,641 | A |   | 4/1978 | Sado |   |
| 4,389,809 | A |   | 6/1983 | Fischer |   |
| 4,474,493 | A | * | 10/1984 | Welch | 403/408.1 |
| 4,681,213 | A |   | 7/1987 | Winiasz |   |
| 5,150,771 | A |   | 9/1992 | Porter |   |
| 6,575,972 | B1 |   | 6/2003 | Gordon |   |
| 6,991,397 | B2 |   | 1/2006 | Welch |   |
| 2004/0198529 | A1 | * | 10/2004 | Moore | 473/296 |

FOREIGN PATENT DOCUMENTS

| DE | 866274 | 7/1949 |
| FR | 2 724 698 | 3/1996 |
| NZ | 198746 | 10/1981 |
| WO | WO 2004113739 A1 * | 12/2004 |

* cited by examiner

*Primary Examiner* — James Brittain
(74) *Attorney, Agent, or Firm* — Greer, Burns & Crain, Ltd.

(57) ABSTRACT

A clamping mechanism, including: a deformable body configured to provide a friction fit with at least one element to which it is fitted, at least one slot in the deformable body, wherein the slot traverses at least a portion of the longitudinal and latitudinal direction of the body.

12 Claims, 10 Drawing Sheets

FIGURE 1

PRIOR ART

FRICTION CLAMP

TECHNICAL FIELD

This invention relates to a friction mechanism.

In particular, this invention relates to a friction mechanism which can be used for clamping.

BACKGROUND ART

The present invention relates particularly to clamps, this term being generally understood to refer to fastening mechanisms used to join, grip, support, or compress mechanical or structural parts.

Clamps generally include parts which are moved together by screws to hold or compress mechanical or structural parts. Tightening the screw brings the clamping surfaces together into a position where they are able to grip or support the desired item or element.

Commonly clamps are used to hold items together during manufacture or building.

One common example is the use of clamps to hold together tubes or pipes. These may include a substantially semi circular or circular portion with flanges, the flanges are then tightened towards one another by a screw or other fastening means, to clamp the semi circular portion around the tube, pipe or other item. This has a number of significant disadvantages, one being the protruding portions, which may easily catch on objects or injure people within the vicinity.

Another significant problem is that clamps can be very slow to do up and unwind.

Additionally such mechanisms, for example KeeKlamp™, often rely on the correct insertion, rotation, and tensioning of one or more threaded elements. If the threaded element is insufficiently tightened the mechanism is prone to loosen with use/vibration. When correctly used the axial length of the threaded element, often a "set-screw", need to be lengthened, with in a narrow range, as if over stretched the threads will strip, and if under stretched the fastener may fail with use/vibration.

Many clamps also make use of standard bolts. This may be undesirable in structural situations where nuts and bolts are susceptible to jiggling loose, or shearing under the pressures applied. In industrial situations it is very important that the fixing is secure, as failure could lead to injury or death to people in the vicinity. For example a screw or bolt if insufficiently tightened may allow the components to telescope or rotate under load or stress.

Clamps are also commonly used in products where the length is changeable, for example ladders, scaffolding, props in the building industry, bicycle seat posts, furniture, walking canes, tent poles to name a few.

The applicants have previously (PCT/NZ2004/000132) developed a mechanism to secure at least one element, which may be telescoping, relative to another element.

PCT/NZ2004/000132 discloses a securing apparatus of a substantially circular circumference, with a deformable body, a slot extending longitudinally along a portion of the apparatus and an aperture in the slot.

This is an auto locking friction mechanism which has an inherent flexibility where the locking element may be expanded or contracted using a tool, heat or other physical means. The elasticity of the mechanism material allows this expansion or contraction to occur and when contracted the mechanism applies a relative and generally opposite force to the element being secured or aligned.

When a releasing tool is applied to the aperture, the slot is widened and opened to allow movement of the telescoping, or other elements being secured. When the releasing tool is removed the deformable body reverts to its original position to provide a secure interference fit to the elements it is attached to.

Unless a long slot along a significant portion or all of the length of the clamp body is used, a further aperture may be positioned at one end of the slot to decrease the stress on the body at the point where the slot ends. Alternatively, a side slot extending around the body, may be used instead, however, this may considerably weaken the body of the clamp.

However this type of clamping mechanism can be improved.

One area for improvement is that the slot leads to the formation of a point of weakness. The point of weakness will occur at the point where the body starts to be deformed by use of the release tool. Opening the slot will lead to the body being forced open at one spot on the body.

This point of weakness may lead to a gradual decrease in the efficiency of the apparatus to secure elements reliably. This would especially be the case on elements which are regularly moved, in this instance weakening, fatigue and breaking of the securing mechanism may occur.

This point of weakness occurs due to the releasing tool having a greater effect near the point of use of the tool. As the securing mechanism relies on an interference fit, this may also lead to poor assembly and/or subsequent failure, or leakage of gas or fluid.

Further, if the slot is not opened up sufficiently or has a non-uniform gap the element over which it must fit may foul the inside of the apparatus. This can lead to the user having to take care when operating the mechanism.

Also the element being clamped may only have clearance between the element and the securing mechanism within the close vicinity of the releasing tool being used. This may increase fouling the inside of the mechanism, and difficulty of use, and adjustment of the elements being held in relation to one another.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

SUMMARY

According to one aspect of the present invention there is provided a clamping mechanism, including a deformable body configured to provide a friction fit with at least one element to which it is fitted, and at least one slot in the deformable body, the clamping mechanism characterized in that the slot traverses at least a portion of the longitudinal and latitudinal direction of the body.

According to another aspect of the present invention there is provided a method of clamping at least one element with a clamping mechanism, the mechanism including a deformable body configured to provide a friction fit with at least one article to which it is fitted, and at least one slot in the deformable body configured such that the slot traverses at least a portion of the longitudinal and latitudinal direction of the body, the method characterized by the steps of:
a) deforming the body by widening the slot,
b) placing the element(s) to be clamped in the correct position within the clamping mechanism,
c) allowing the body to return to its original shape.

The clamping mechanism may be used for a variety of purposes. Throughout this specification, reference will be made to use of the clamp to hold two movable elements together. However, it should be appreciated that a wide variety of other uses may be possible, these include ladders, scaffolding, props in the building industry, bicycle seat posts, furniture, walking canes, tent poles to name a few.

In a preferred embodiment the deformable body of the clamping mechanism may be provided by the mechanism being made out of a material of a type and construction that possesses a material memory.

This means if the body is deformed as a result of forces placed on it, there is a natural tendency for the material memory to bias the clamping mechanism back towards its original shape.

In a preferred embodiment the cross-section of the body may be substantially circular, and shall be referred to as such herein. However, this should not be seen as limiting as any other shapes may be utilized with the present invention, for example an oval, hexagonal, or substantially square shaped clamping mechanism. These shapes may have an added advantage over circular shapes as they may resisting rotation of elements being held by the clamp.

A circular cross-section of the body is preferred because this shape works best with a 'material memory'.

In a preferred embodiment the internal diameter of the clamp is increased by applying force to the slot in the body.

Throughout this specification the term slot should be taken to mean an opening which can be widened (expanded) to increase the internal diameter of the clamp.

The longitudinal and latitudinal directions of the body should be taken to mean the length and width of the body. The slot therefore extends at least partially around the circumference of the mechanism and at least partially along the length of the body.

The slot may extend around at least part of the body in the form of a straight diagonal, zig zag, or any other path.

In preferred embodiments the slot may be of any length.

In a preferred embodiment the slot may extend around at least part of the circumference of the clamping mechanism in a helical or spiral manner.

It should be appreciated that the longer the spiral around the clamp, the greater the widening of the internal diameter possible, and therefore the greater the clamping strength which may be achieved.

It will be appreciated that if the clamping mechanism is not circular or oval in circumference, the spiral slot may vary, for example if the clamping mechanism is substantially square shaped the slot may angle across each side, ensuring that the slot traverses both the longitudinal and latitudinal direction of the body.

In some embodiments the clamping mechanism may have one slot traversing the longitudinal and latitudinal direction of the body. However in some alternative embodiments it may be desired to have multiple slots, traversing the body of the clamping mechanism.

In a preferred embodiment the slot may be substantially the same width along its length. Alternatively the slot may narrow or widen in places, for example it may widen in areas where additional forces may be expected.

In a preferred embodiment the rotational distance of the spiral (i.e. distance along the length of the mechanism through which the spiral slot makes one complete rotation around the diameter of the mechanism) may be equal along the length of the body, or the length of the slot.

Given the nature of a spiral slot it will be appreciated that the internal diameter of the clamp may be increased in a number of ways:

Firstly the spiral slot may be widened or opened by rotating the two ends of the clamp with respect to one another, or with a tool, as discussed in detail below. This will result in the spiral slot opening wider, and the internal diameter of the clamp increasing. This is the preferred mode of action.

Secondly, the spiral may be compressed to increase the internal diameter of the clamp. In this instance, the increase in internal diameter will be limited by the width of the slot.

In a preferred embodiment the original internal dimensions of the clamping mechanism may be smaller than the external dimensions of the elements to be secured or clamped.

In this embodiment, the deformable body is deformed from its original shape by increasing the internal diameter of the clamp against its material memory.

The increased diameter of the clamp allows the elements to be clamped to be placed in the correct position within the clamp.

Once the elements to be clamped are in position, the deformable body can be returned, or allowed to return to its original shape. The clamping mechanism having smaller internal dimensions to the elements being clamped prevents the body from returning fully to its original dimensions, and thus the body exerts a force towards its original shape, and against the elements (being clamped) which are hindering this complete reversion to the original shape.

It should be appreciated that the opposite could apply to use the clamping mechanism to clamp or hold elements from the interior side rather than from the exterior side. In this case the clamp would have larger external dimensions than the internal dimensions of the elements to be clamped, and the slot would be used to decrease the internal diameter, rather than increase it.

The use of a slot which transverses the longitudinal and latitudinal direction of the clamp overcomes a number of problems with the prior art, and improves on the auto-locking friction mechanism previously developed by the applicant.

Advantages of the present invention include:

The auto-locking friction action of the clamping mechanism means that nuts and bolts are not required. This decreases the time required to do up or unwind the clamp, and prevents failure of the clamp due to shearing, jiggling out and loss of bolts.

Particularly, the spiral shaped slot distributes the stresses and clamping forces more evenly along the clamp body.

This decreases the formation of weak points which arise when linear slots are used. Weak points form in the body in areas where the forces can no longer be spread.

Therefore, the use of a spiral slot decreases the formation of weak points, thereby increasing the strength of the clamp and reducing the possibility of fatigue or breakage.

Further, the spiral shaped slot may require less force to widen than a linear slot, this is due to the spiral extending around the curvature of the body.

In one preferred embodiment the slot may be widened to increase the internal diameter of the clamp by rotation of one end of the spiral or clamp relative to the other.

However, in other embodiments the slot may be widened to increase the interior diameter of the clamp by use of a tool.

The tool may be used directly in the slot, or the slot may include at least one area specifically designed for use of a tool. This shall be referred to herein as the release aperture.

In one embodiment the slot may include at least one non-circular release aperture, for example, oval or cam shaped, with the longer axis aligned with the spiral shaped slot in that region.

When an oval or cam shaped tool head is inserted into the release aperture and rotated, it can widen or open up the aperture and corresponding slot. It should be appreciated that the greater the difference between the minor axis of the oval aperture and the major axis of the release tool, the greater the slot will be widened and the greater the increase in the internal diameter of the clamp.

Oval or cam based releasing tools limit the maximum opening force applied to the slot. Careful tool specifications and sizing can therefore help avoid over stretching the body of the clamp, which may lead to permanent deformation/failure of the clamp.

In one preferred embodiment each spiral slot may include at least one release aperture. However, this should not be seen as limiting as one slot may include multiple release apertures to allow release of the clamping device along the entire length of the slot.

It should be appreciated that the force exerted by the tool will be reduced the further away from the tool the spiral extends.

It should be appreciated that the tool may either be removed after use, or may remain attached to, or associated with the clamping mechanism when not in use.

In a preferred embodiment the clamping mechanism may have an internal cross section which is parallel along its whole length.

However, this should not be seen as limiting, as in some embodiments the clamping mechanism may be reduced in diameter or tapered towards at least one end or location of the clamp.

In a preferred embodiment the element(s) to be clamped may have at least some clearance from the clamp along a significant length of the body.

This addresses the problem with the prior art, of fouling of the inside of the clamp if the slot does not lead to sufficient widening of the internal diameter.

In a preferred embodiment the clamping mechanism may also include a compressing element or seal. This prevents the leakage of material from within a clamped element. The compressing element or seal may include rubber sleeves, O-rings or other sealing or vibration dampening elements.

In one preferred embodiment the clamping mechanism may also include at least one stopping element on the interior of the clamping mechanism to accurately locate the element(s) to be clamped.

In some embodiments the internal body of the clamp may contain at least one ridge or other interacting element which improves the grip to the article which is inserted.

In some embodiments the element(s) to be clamped may also include at least one complimentary recess or portion complementary to the interacting element of the clamping mechanism.

While the present invention will be discussed as connecting together two telescoping, or non-telescoping elements, it should be appreciated that the present invention can also be used to clamp multiple elements. For example the deformable body may include a side offshoot into which a third element may be clamped.

It will be appreciated that the clamping mechanism described may be used for either temporary or permanent clamping. For example it could be used in addition to the use of adhesive to exert a force on the join in addition to that provided by the adhesive, thereby increasing the strength of the join.

BRIEF DESCRIPTION OF DRAWINGS

Further aspects of the present invention will become apparent from the ensuing description which is given by way of example only and with reference to the accompanying drawings in which.

DETAILED DESCRIPTION

Figure 1:
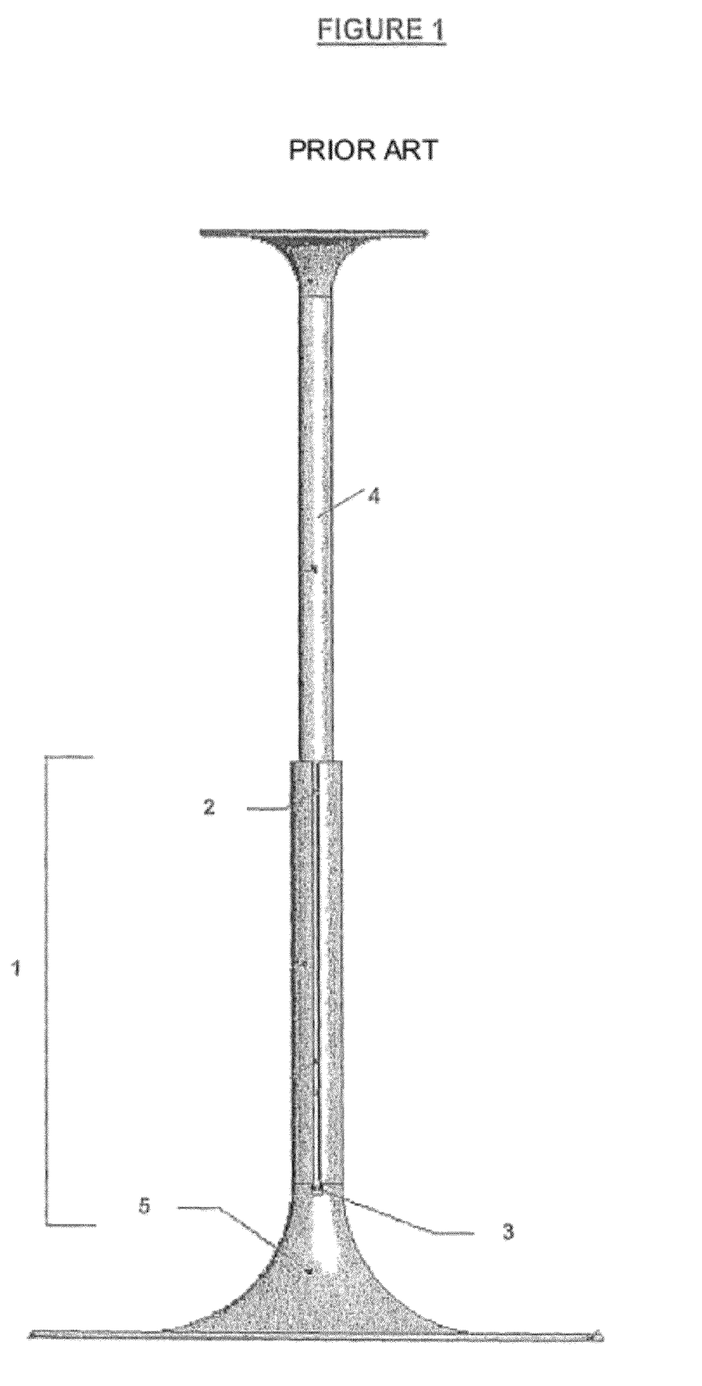
FIG. 1 shows a schematic of a prior art clamping mechanism.

FIG. 1 shows a clamping mechanism of the prior art.

FIG. 1 shows the clamping mechanism (1), with a linear slot (2) and a stress reduction hole (3).

FIG. 1 shows the clamping mechanism (1) clamping an extendible, and telescoping element (4), to a base element (5) which is in this case integral with the clamping mechanism (1).

Figure 2:
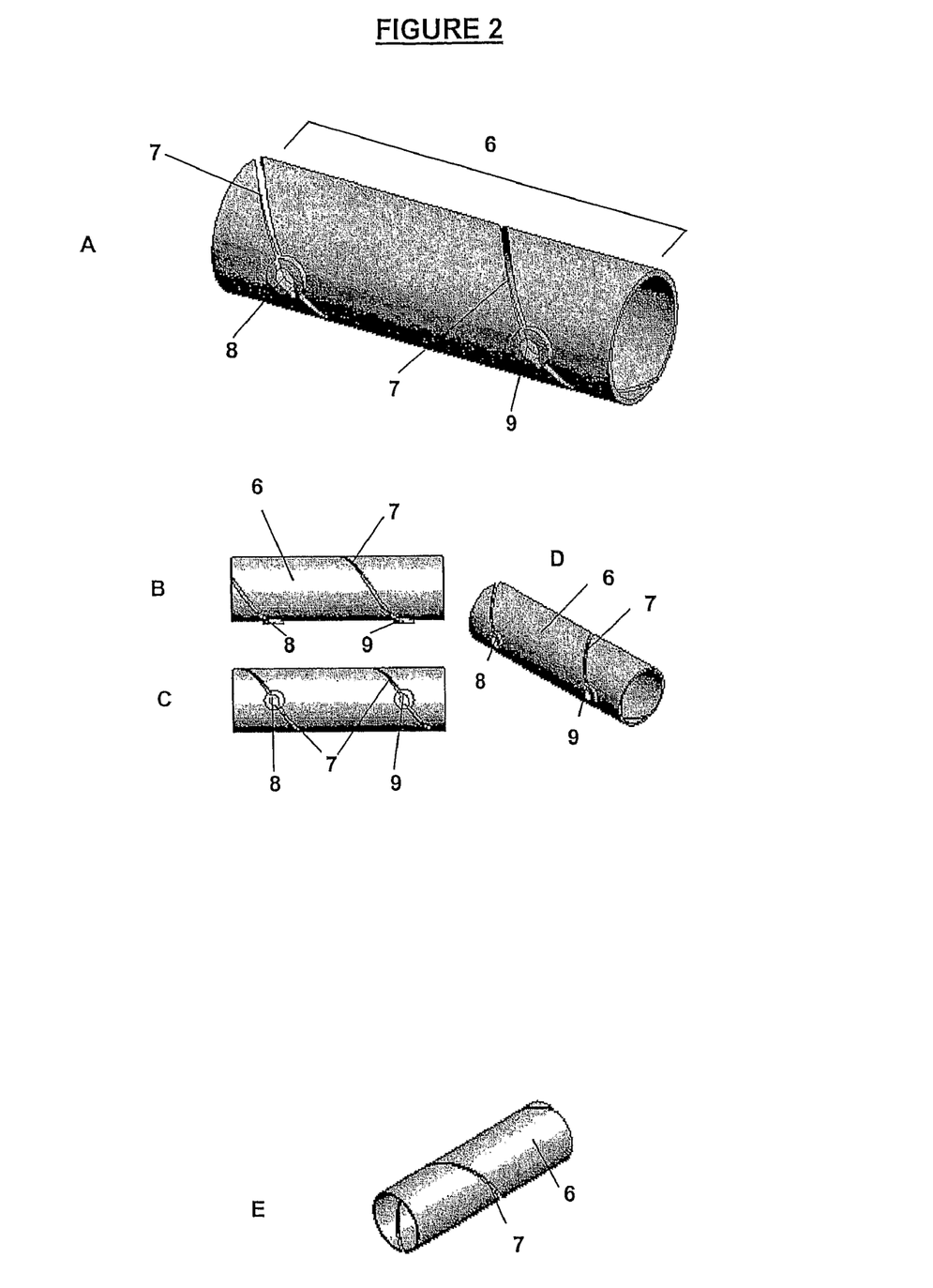
FIG. 2 shows one embodiment of the clamping mechanism.

FIGS. 2 A, B and C show one embodiment of the present invention. FIG. 2 shows the clamping mechanism (6) with a spiral slot (7) traversing the clamp body in both a longitudinal and latitudinal manner from one end of the body to the other. The slot (7) also includes two release apertures or apertures (8) and (9). These release apertures can have a cam shaped release tool (not shown) inserted and rotated to open the slot (7) and thereby increase the internal diameter of the clamp (6). In this example the release apertures (8) and (9) are positioned on the same side of the clamp, this allows easy and simultaneous or consecutive use of the release apertures.

However, the release apertures may also be positioned around the clamp.

In this example, the force exerted by the clamp will be substantially the same along its entire length, assuming that the element(s) being clamped are the same size and shape.

Alternatively, as shown in FIG. 2 E the clamp may not include release apertures. In this case rotation of the ends of the clamp with respect to one another would open the spiral slot, thereby increasing the internal diameter.

Alternatively, the rotational action could shorten the helix, utilizing the fact that a spring or helix under compression from the ends will shorten in length and increase in diameter. In this instance, the greater the width of the slot, the greater the increase in internal diameter may be obtained.

Figure 3A:
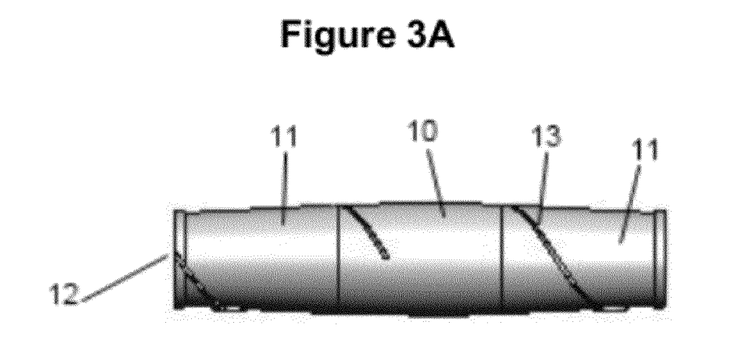
FIG. 3 shows one embodiment of the clamping mechanism with both ends of the clamp being tapered.
Figure 3B:
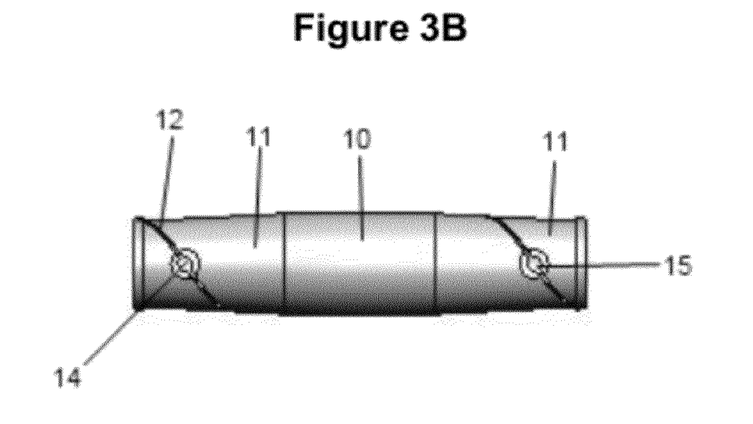
Figure 3C:
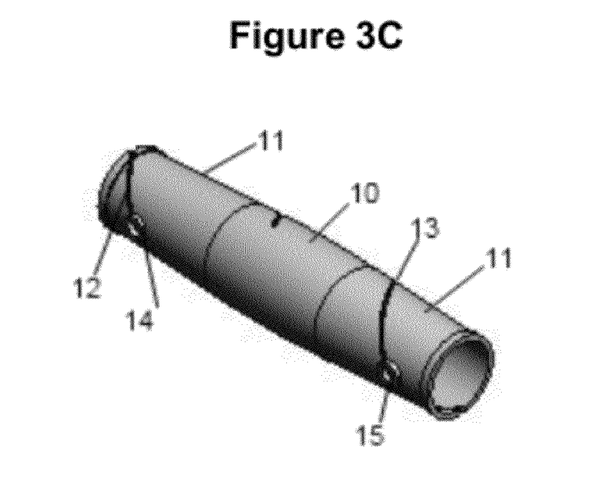

FIGS. 3 A, B and C show another embodiment of the present invention. In this case the clamp includes a central portion (10), and two tapered end portions (11).

In this instance the spiral slots (12) and (13) are positioned mostly on the tapered end portions (11). This allows the end portions (12) and (13) to increase in internal diameter to substantially the same as the central portion (10) to allow the introduction of at least one element (not shown) to be clamped. In this example, the material memory, and clamping action will be concentrated at the end portions (11) rather than along the entire length of the clamping mechanism.

In this case, each of the two slots (12) and (13) has an associated release aperture (14) and (15) respectively.

Figure 4:
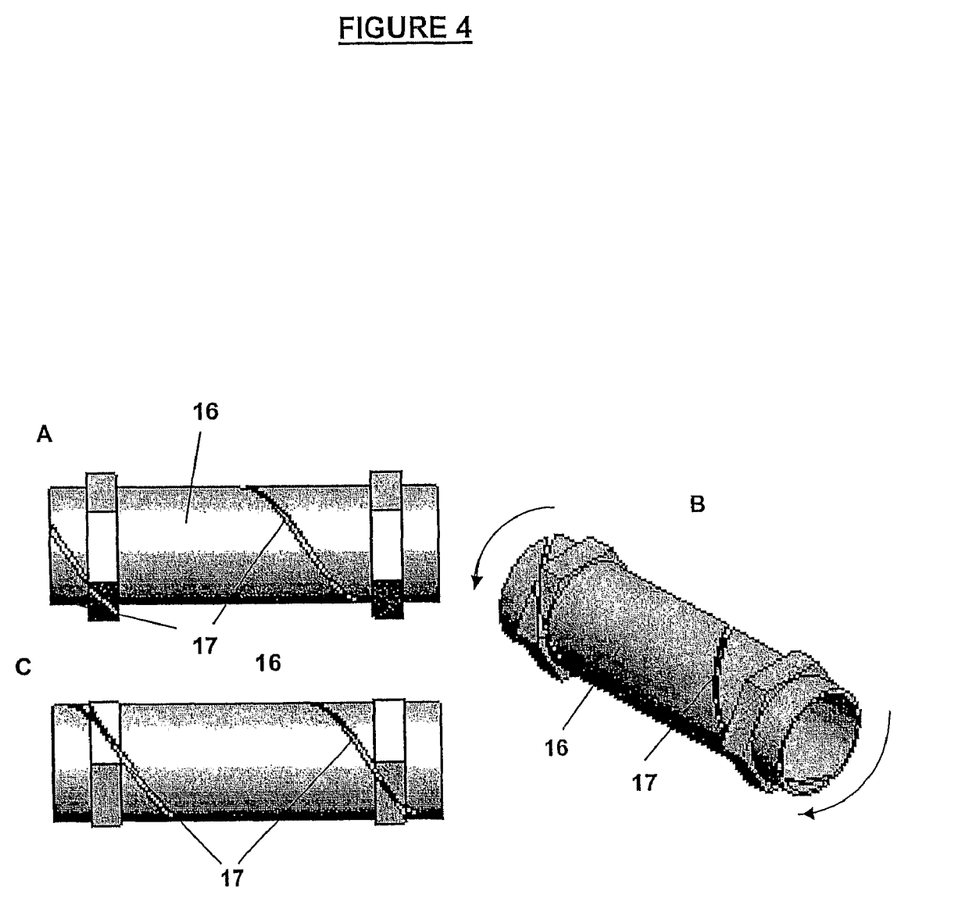
FIG. 4 shows a second embodiment of the clamping mechanism.

FIGS. 4 A, B and C show another example of the present invention. This shows the clamp (16) and one spiral slot (17) extending along the length of the clamp. This is an example without release apertures or the use of a tool. Therefore the slot (17) will be opened, leading to an increase in the internal diameter by the rotation of the two ends of the clamp in opposition directions to one another. For example, movement of the two ends of the clamp as shown by arrows (18) and (19) respectively will lead to the slot opening and an increase in the internal diameter.

Figure 5:
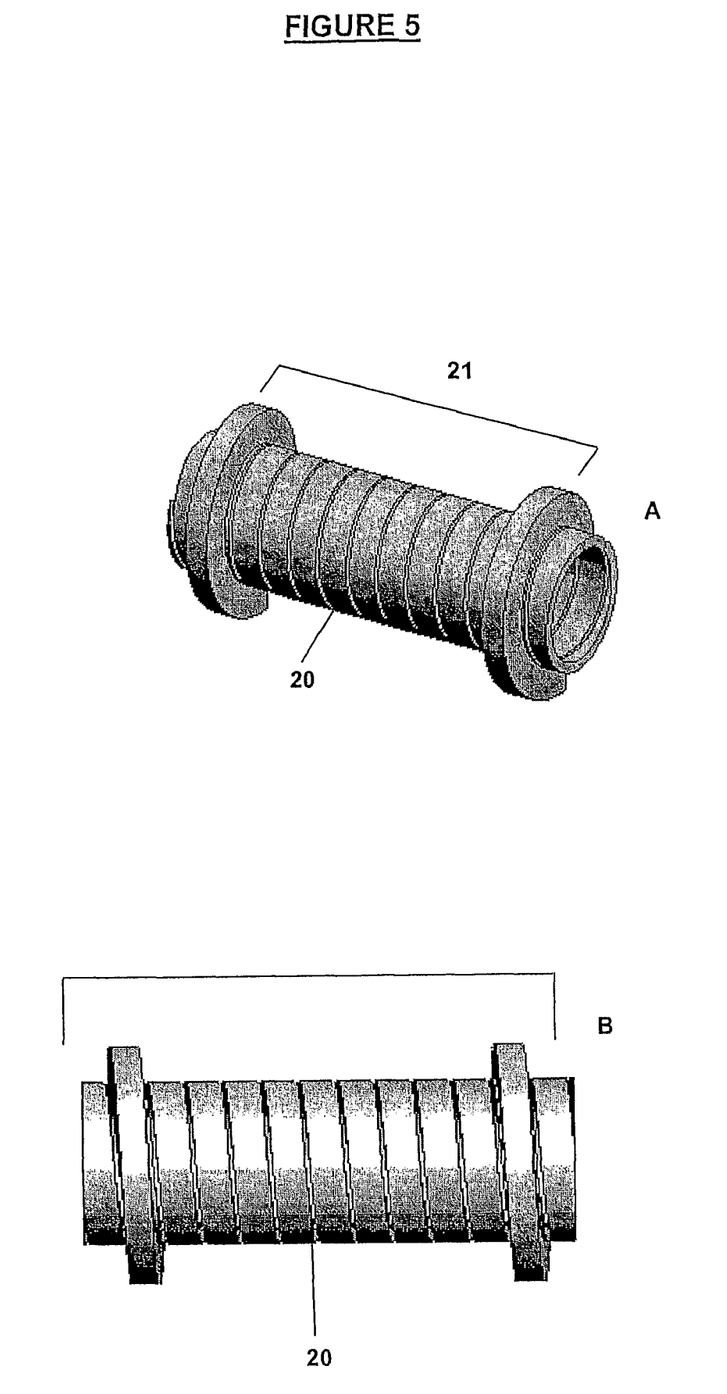
FIG. 5 shows a third embodiment of the clamping mechanism.

FIGS. 5 A and B show a similar clamping mechanism to that shown in FIG. 4, however, with a much higher revolution number for the spiral slot (20) which extends all the way along the clamp (21). Having a spiral with a higher revolution number, in this case approximately 12 instead of approximately 1½ as shown in FIG. 4 will increase the amount by which the slot can be opened up, and the possible increase in the internal diameter of the clamp.

Figure 6:
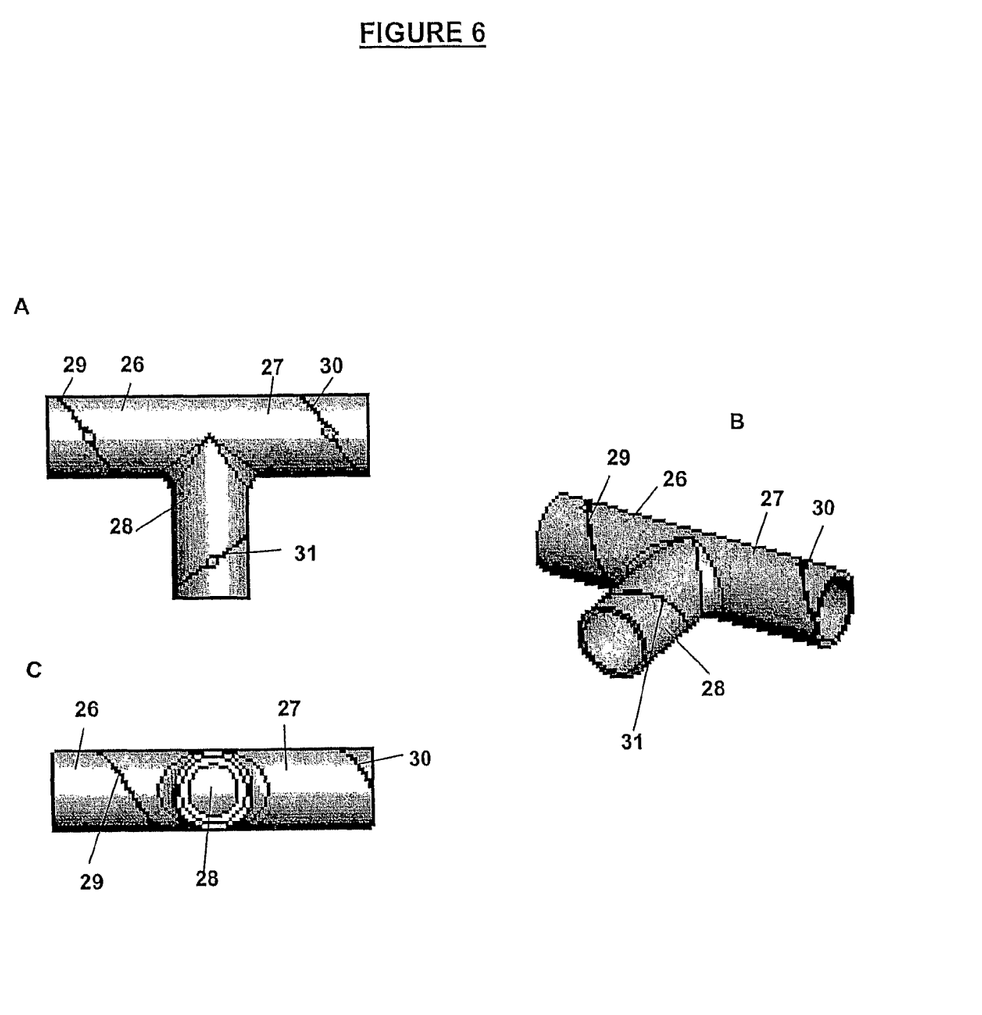
FIG. 6 shows an embodiment of the clamping mechanism wherein three elements are being clamped together.

FIGS. 6 A, B and C show an example of the present invention, configured to clamp 2 or 3 elements together. The clamp includes three portions (26), (27) and (28), each incorporating a spiral shaped slot (29), (30) and (31) respectively with release apertures.

This clamp could be used to clamp three elements together, one being positioned within each portion (26), (27) and (28) respectively, alternatively, one element could pass through both portions (26) and (27), with a second element clamped at substantially perpendicular to the first element via portion (28).

Figure 7:
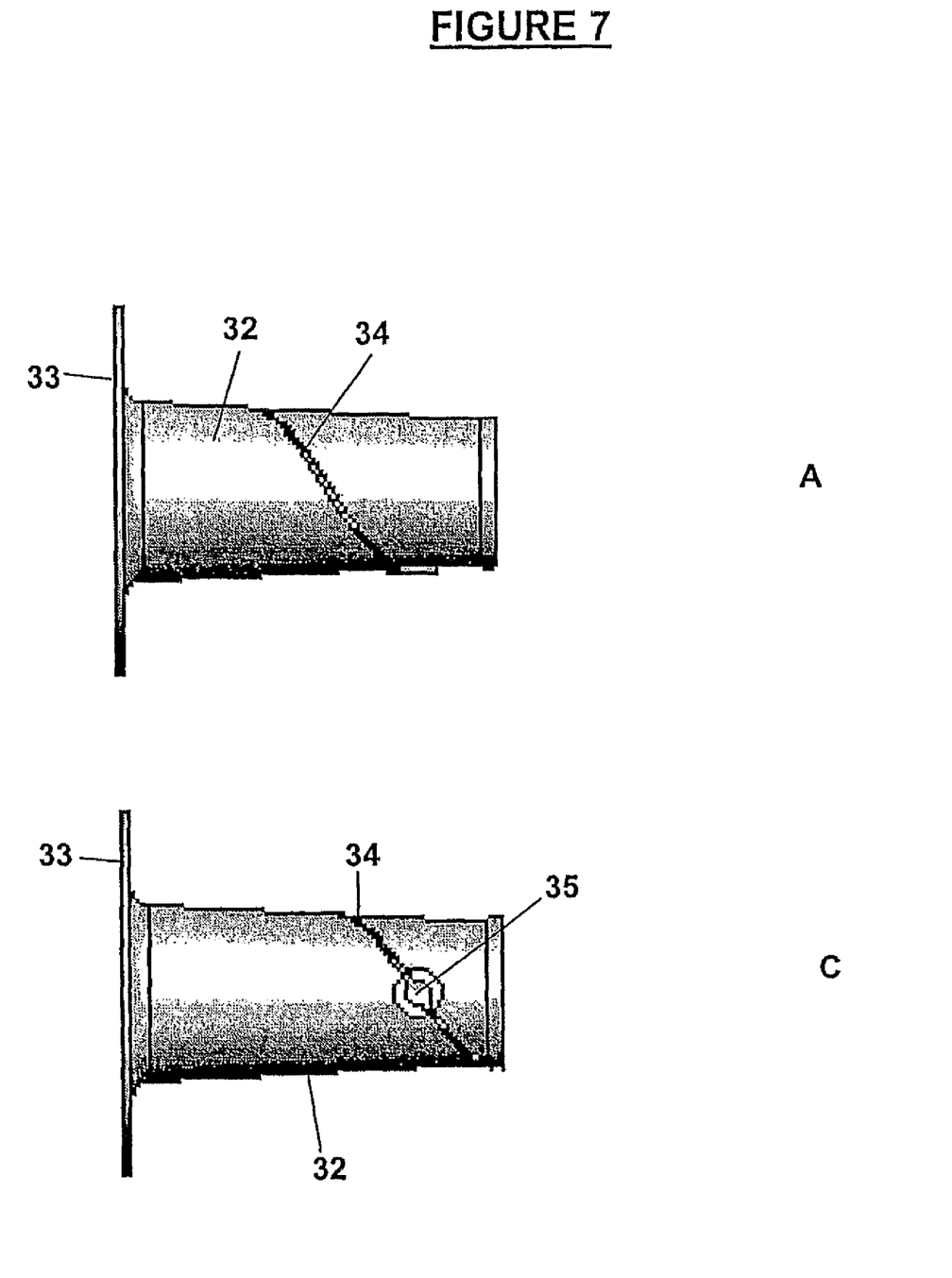
FIG. 7 shows another embodiment of the clamping mechanism showing a tapered end.
Figure 7B:
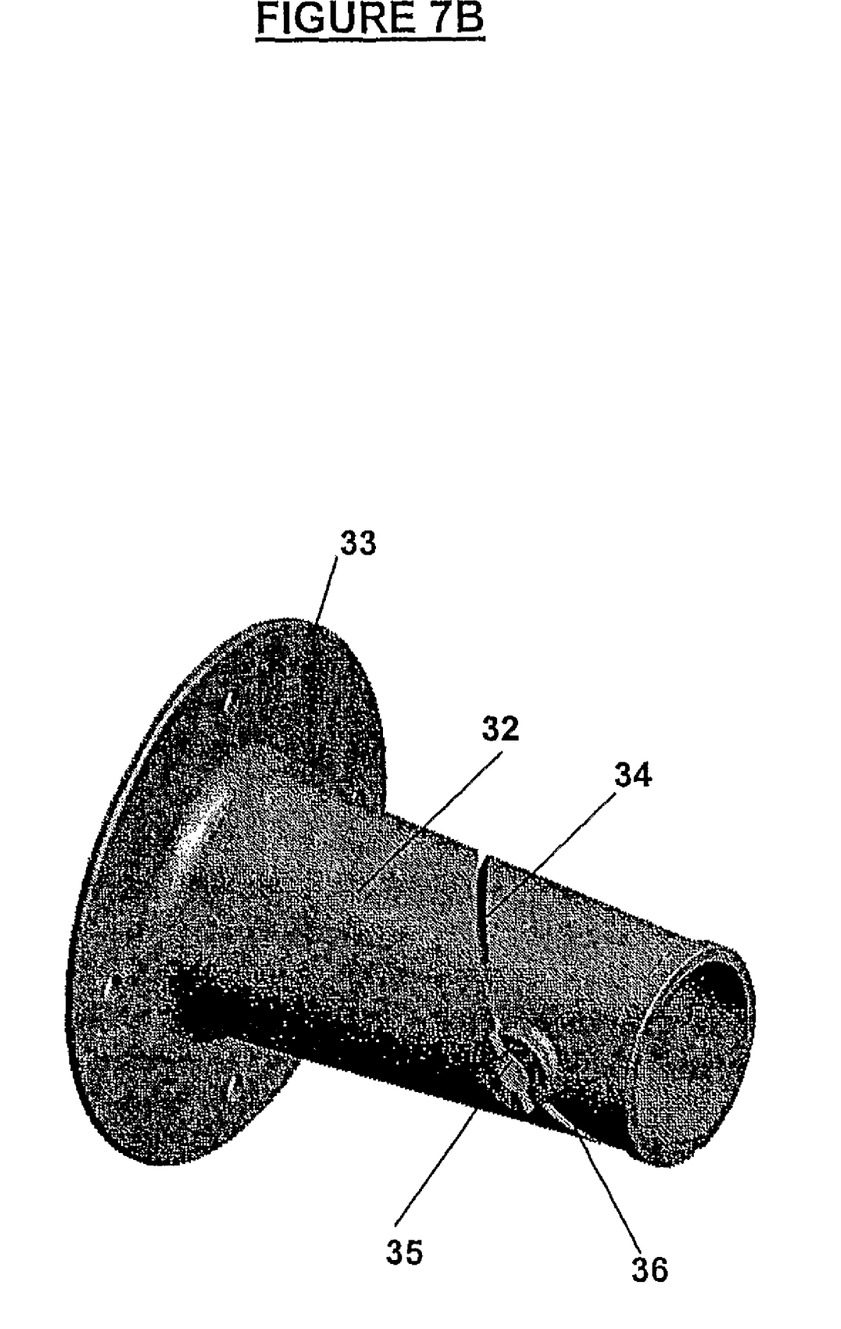

FIGS. 7 A, B and C show another example of a tapered clamp (32). This clamp includes a base portion (33) which can be attached onto a flat surface via screw, nails, or other standard attachment means.

Extending from the base portion (33) is the clamping mechanism (32), including a spiral slot (34) and release aperture (35). As can be seen the release aperture has a rim (36) around same to decrease any negative effects from use of the release tool on the clamp.

Figure 8:
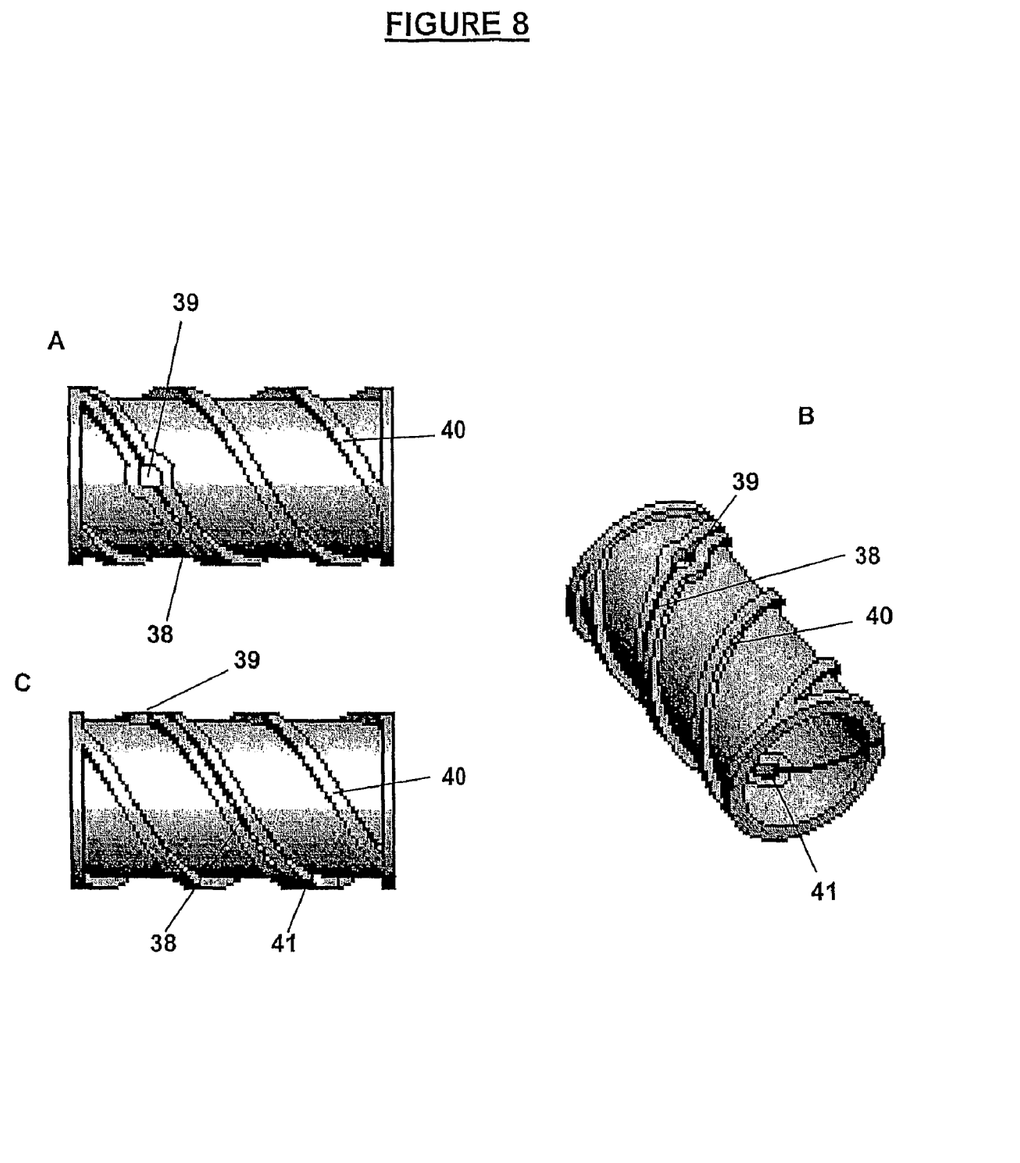
FIG. 8 shows a sixth embodiment of the clamping mechanism.

FIGS. 8 A, B and C shows a schematic of another example of a clamp of the present invention, showing a spiral slot (38) and release apertures (39) and (41) on opposing sides of the clamp. The clamp in this example also has reinforcing ridges (40) extending around the clamp to increase the strength of same.

Figure 9:
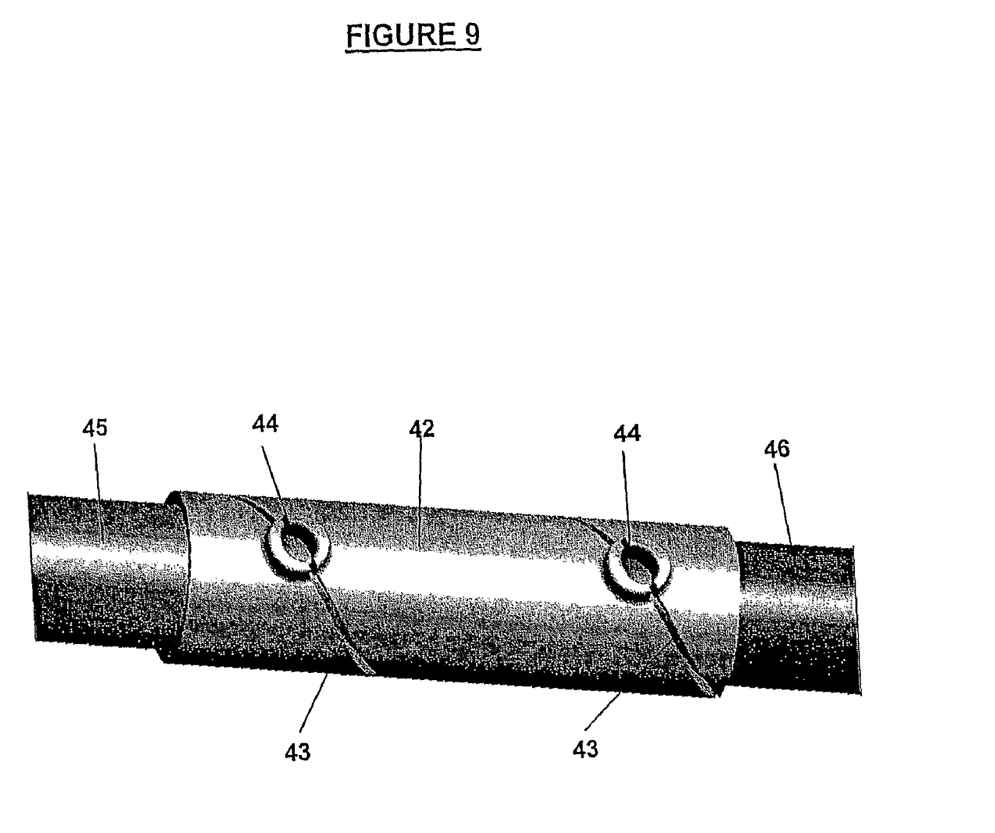
FIG. 9 shows a seventh embodiment of the clamping mechanism.

FIG. 9 shows a clamp (42), including a spiral slot (43) extending around the length of the clamp, with two release apertures (44). The clamp in this example is shown clamping together two shafts (45) and (46) respectively.

Aspects of the present invention have been described by way of example only and it should be appreciated that modifications and additions may be made thereto without departing from the scope thereof as defined in the appended claims.

I claim:

1. A clamping mechanism, comprising:
   a deformable body configured to provide a friction fit with at least one element to which it is fitted, wherein an internal dimension of the body is smaller than an exterior dimension of the element to which it is fitted;
   at least one slot in the deformable body, wherein the slot is in the form. of a spiral; and,
   the slot traverses at least a portion of the longitudinal and latitudinal direction of the body, the body including at least one release aperture in connection with the slot.

2. The clamping mechanism as claimed in claim 1, wherein the body is made of a material that possesses material memory.

3. The clamping mechanism as claimed in claim 1, wherein the cross-section body is substantially circular.

4. The clamping mechanism as claimed in claim 1, wherein the body incorporates two or more slots.

5. The clamping mechanism as claimed in claim 1, configured such that the internal diameter of the clamp is increased by increasing the width of the slot.

6. The clamping mechanism as claimed in claim 1, configured such that the width of the slot is increased by rotating opposing ends of the clamp relative to one another.

7. The clamping mechanism as claimed in claim 1, wherein the release aperture is a substantially cam or oval shape.

8. The clamping mechanism as claimed in claim 1, wherein the release aperture is configured such that a tool can be rotated in the release aperture to increase the width of the slot.

9. The clamping mechanism as claimed claim 1, wherein the body is tapered towards at least one end.

10. The clamping mechanism as claimed in claim 1, wherein the slot makes at least one complete rotation about the body.

11. The clamping mechanism as claimed in claim 1, wherein the body includes two release apertures in connection with the slot.

12. A method of clamping at least one element with a clamping mechanism, the mechanism including:
   a deformable body configured to provide a friction fit with at least one article to which it is fitted, and wherein an internal dimension of the body is smaller than an exterior dimension of the article to which it is fitted, and
   at least one slot in the deformable body configured such that the slot traverses at least a portion of the longitudinal and latitudinal direction of the body, and wherein the slot is in the form of a spiral,
   the body including at least one release aperture in connection with the slot,
   the method comprising:
   a. deforming the body by widening the slot against the material memory of the body;
   b. placing the elements to be clamped in the correct position within the clamping mechanism; and
   c. allowing the body to return to its original shape.

* * * * *